United States Patent
Sugiura et al.

(10) Patent No.: US 8,613,226 B2
(45) Date of Patent: Dec. 24, 2013

(54) ULTRASONIC FLOW METER HAVING ULTRASONIC SENSOR WITH PLURALITY OF TRANSMITTERS FOR TRANSMITTING ULTRASONIC WAVES AT DIFFERENT FREQUENCIES

(75) Inventors: Makiko Sugiura, Hekinan (JP); Takahiko Yoshida, Okazaki (JP)

(73) Assignee: DENSO CORPORATION, Kariya (JP)

( * ) Notice: Subject to any disclaimer, the term of this patent is extended or adjusted under 35 U.S.C. 154(b) by 444 days.

(21) Appl. No.: 13/033,805

(22) Filed: Feb. 24, 2011

(65) Prior Publication Data

US 2011/0209558 A1 Sep. 1, 2011

(30) Foreign Application Priority Data

Mar. 1, 2010 (JP) .................................. 2010-43836

(51) Int. Cl.
*G01F 1/66* (2006.01)

(52) U.S. Cl.
USPC ...................................................... 73/861.27

(58) Field of Classification Search
None
See application file for complete search history.

(56) References Cited

U.S. PATENT DOCUMENTS

| | | | | |
|---|---|---|---|---|
| 4,015,470 A | * | 4/1977 | Morrison | 73/861.03 |
| 4,616,510 A | * | 10/1986 | Moore | 73/861.27 |
| 6,293,156 B1 | * | 9/2001 | Shen et al. | 73/861.26 |
| 6,522,289 B1 | | 2/2003 | Frerichs et al. | |
| 7,603,916 B2 | * | 10/2009 | Gysling | 73/861.42 |
| 2002/0078760 A1 | | 6/2002 | Matsushima et al. | |
| 2006/0196272 A1 | * | 9/2006 | Sugiura et al. | 73/599 |
| 2008/0165620 A1 | * | 7/2008 | Sugiura | 367/99 |
| 2009/0178490 A1 | | 7/2009 | Konzelmann et al. | |
| 2009/0260422 A1 | * | 10/2009 | Sugiura et al. | 73/24.04 |
| 2010/0094569 A1 | * | 4/2010 | Gysling | 73/861.18 |
| 2010/0095782 A1 | * | 4/2010 | Ferencz et al. | 73/861.28 |

FOREIGN PATENT DOCUMENTS

| | | |
|---|---|---|
| JP | A-56-67716 | 6/1981 |
| JP | A-06-258298 | 9/1994 |
| JP | A-08-94594 | 4/1996 |
| JP | A-10-90028 | 4/1998 |
| JP | A-11-118555 | 4/1999 |
| JP | A-2004-153797 | 5/2004 |
| JP | A-2010-276523 | 12/2010 |

OTHER PUBLICATIONS

E.J. Evans et al. "Relational expression of temperature (t), humidity (h), and sound absorption coefficient (m)," Acustica 6, 238-244, 1956.
Office Action mailed Oct. 8, 2013 issued in corresponding JP patent application No. 2010-043836 (and English translation).

* cited by examiner

*Primary Examiner* — Harshad R Patel
(74) *Attorney, Agent, or Firm* — Posz Law Group, PLC

(57) ABSTRACT

An ultrasonic flow meter includes a first ultrasonic sensor, a second ultrasonic sensor, a volume-flow operation portion, a temperature operation portion, a pressure operation portion, and a correction operation portion. The ultrasonic sensors transmit and receive a plurality of ultrasonic waves of different frequencies and are disposed on opposite sides of a flow channel in which fluid flows. The volume-flow operation portion calculates a volume flow of the fluid based on a propagation time difference of the ultrasonic wave. The temperature operation portion analyzes signals from one of the ultrasonic sensors and calculates a temperature of the fluid. The pressure operation portion analyzes signals from one of the ultrasonic sensors and calculates a pressure of the fluid. The correction operation portion corrects the volume flow with the temperature and the pressure.

11 Claims, 7 Drawing Sheets

US 8,613,226 B2

ULTRASONIC FLOW METER HAVING ULTRASONIC SENSOR WITH PLURALITY OF TRANSMITTERS FOR TRANSMITTING ULTRASONIC WAVES AT DIFFERENT FREQUENCIES

CROSS REFERENCE TO RELATED APPLICATIONS

The present application is based on and claims priority to Japanese Patent Application No. 2010-43836 filed on Mar. 1, 2010, the contents of which are incorporated in their entirety herein by reference.

BACKGROUND OF THE INVENTION

1. Field of the Invention

The present invention relates to an ultrasonic flow meter that measures volume flow or mass flow of fluid using an ultrasonic wave.

2. Description of the Related Art

JP-A-56-67716 discloses an ultrasonic flow meter that uses a propagation time difference method FIG. 7 is a diagram showing the ultrasonic flow meter. The ultrasonic flow meter includes devices 91 and 92 disposed on a sidewall of a pipe 90 in which fluid flows. The device 91 is disposed upstream in a flow direction of the fluid and the device 92 is disposed downstream in the flow direction of the fluid. The devices 91 and 92 are obliquely arranged so that a radiation axis of an ultrasonic wave crosses the flow direction of the fluid at an acute angle.

When a propagation time of an ultrasonic wave from the device 91 to the device 92 is indicated by "tA," a propagation time of the ultrasonic wave from the device 92 to the device 91 is indicated by "tB," a distance between the devices 91 and 92 is indicated by "L," a sound speed is indicated by "C," a flow rate of the fluid is indicated by "V," and an angle between the flow direction and the radiation axis of the ultrasonic wave is indicated by "θ" and when the flow rate V=0, the relationship of tA=tB=L/C is satisfied. When V>0, a relationship of tA=L/(C+V cos θ) and tB=L/(C−V cos θ) is satisfied. That is, V=L((1/tA)−(1/tB))/2 cos θ. When a cross-sectional area of the pipe 90 is indicated by "S" the volume flow "Q" is calculated from Q=SV.

The sound speed depends on a pressure of the fluid and a humidity of the fluid. Thus, in order to calculate the volume flow with accuracy, it is required to correct the volume flow based on the pressure of the fluid and the humidity of the fluid. WO 2007/020113 A1 (corresponding to US 2009/0178490 A1) discloses an ultrasonic flow meter that measures a pressure of fluid and a humidity of the fluid by providing an ultrasonic sensor, a pressure sensor, and a temperature sensor on a flow channel and corrects a volume flow based on the measured values. The temperature sensor is used when the sound speed is corrected with the humidity.

Because the above-described ultrasonic flow meter needs the pressure sensor and the temperature sensor, a dimension of the ultrasonic flow meter increases, and an installing space of the ultrasonic flow meter increases. In addition, a manufacturing cost of the ultrasonic flow meter increases.

SUMMARY OF THE INVENTION

In view of the foregoing problems, it is an object of the present invention to provide an ultrasonic flow meter that can correct a volume flow based on a pressure a humidity of fluid without a pressure sensor and a temperature sensor.

An ultrasonic flow meter according to an aspect of the present invention includes a first ultrasonic sensor, a second ultrasonic sensor, a volume-flow operation portion, a temperature operation portion, a pressure operation portion, and a correction operation portion. Each of the first ultrasonic sensor and the second ultrasonic sensor transmits and receives a plurality of ultrasonic waves of different frequencies. The first ultrasonic sensor is disposed on a side of a flow channel in which fluid flows in a flow direction. The second ultrasonic sensor is disposed on an opposite side of the flow channel from the first ultrasonic sensor. The second ultrasonic sensor is disposed downstream of the first ultrasonic sensor in the flow direction. The volume-flow operation portion orders the first ultrasonic sensor and the second ultrasonic sensor to transmit and receive one of the ultrasonic waves alternately. The volume-flow operation portion calculates a propagation time difference of the one of the ultrasonic waves between the first ultrasonic sensor and the second ultrasonic sensor and calculates a volume flow of the fluid based on the propagation time difference. The temperature operation portion analyzes signals output from the first ultrasonic sensor or the second ultrasonic sensor that receives the ultrasonic waves and calculates a temperature of the fluid corresponding to a humidity of the fluid based on an analyzing result. The pressure operation portion analyzes signals output from the first ultrasonic sensor or the second ultrasonic sensor that receives the ultrasonic waves and calculates a pressure of the fluid based on an analyzing result. The correction operation portion corrects the volume flow calculated by the volume-flow operation portion with the temperature calculated by the temperature operation portion and the pressure calculated by the pressure operation portion.

The ultrasonic flow meter calculates the volume flow of the fluid, the pressure of the fluid, and the temperature of the fluid corresponding to the humidity of the fluid, and corrects the volume flow with the calculated pressure and the calculated temperature. Thus, the ultrasonic flow meter can correct the volume flow based on the pressure of the fluid and the humidity of the fluid without a pressure sensor and a temperature sensor.

BRIEF DESCRIPTION OF THE DRAWINGS

Additional objects and advantages of the present invention will be more readily apparent from the following detailed description of preferred embodiments when taken together with the accompanying drawings. In the drawings.

DETAILED DESCRIPTION OF THE PREFERRED EMBODIMENTS

An ultrasonic flow meter according to an exemplary embodiment of the present invention will be described with reference to FIG. 1 to FIG. 3B. In the following description, a transmitted wave means an ultrasonic wave transmitted from the ultrasonic flow meter 1 and a received wave means an ultrasonic wave received by the ultrasonic flow meter 1.

Figure 1:
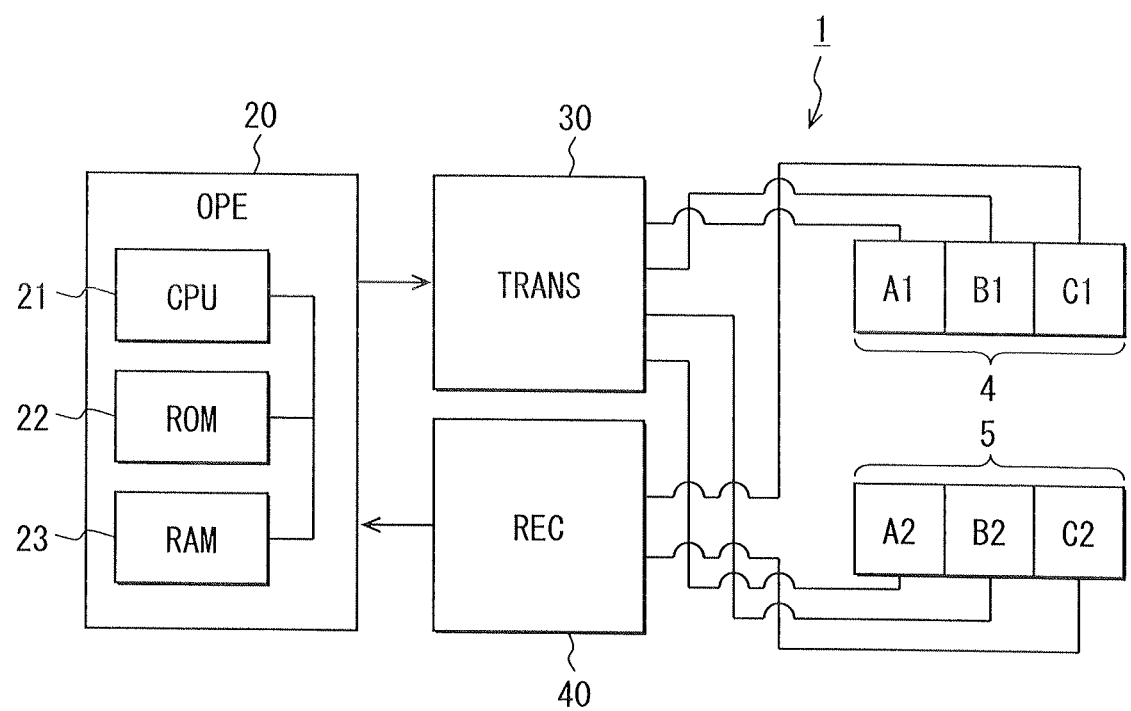
FIG. 1 is a diagram showing an ultrasonic flow meter according to an exemplary embodiment of the present invention.

As shown in FIG. 1, the ultrasonic flow meter 1 includes a first ultrasonic sensor 4 and a second ultrasonic sensor 5. The first ultrasonic sensor 4 includes transmitting elements A1 and B1 that transmit ultrasonic waves to the second ultrasonic sensor 5 and a receiving element C1 that receives ultrasonic waves transmitted from the second ultrasonic sensor 5. The second ultrasonic sensor 5 includes transmitting elements A2 and B2 that transmit the ultrasonic waves to the first ultrasonic sensor 4 and a receiving element C2 that receives the ultrasonic waves transmitted from the first ultrasonic sensor 4.

The transmitting elements A1 and B1 transmit the ultrasonic waves of different frequencies, and the transmitting elements A2 and B2 transmit the ultrasonic waves of different frequencies. The transmitting frequencies of the transmitting elements A1 and A2 are the same, and the transmitting frequencies of the transmitting elements B1 and B2 are the same. The receiving element C2 receives the ultrasonic waves of different frequencies transmitted from the transmitting elements A1 and B1. The receiving element C1 receives the ultrasonic waves of different frequencies transmitted from the transmitting elements A2 and B2. The transmitting frequency of each of the transmitting elements A1 and A2 is indicated by "fa," and the transmitting frequency of each of the transmitting elements B1 and B2 is indicated by "fb."

Figure 2A:
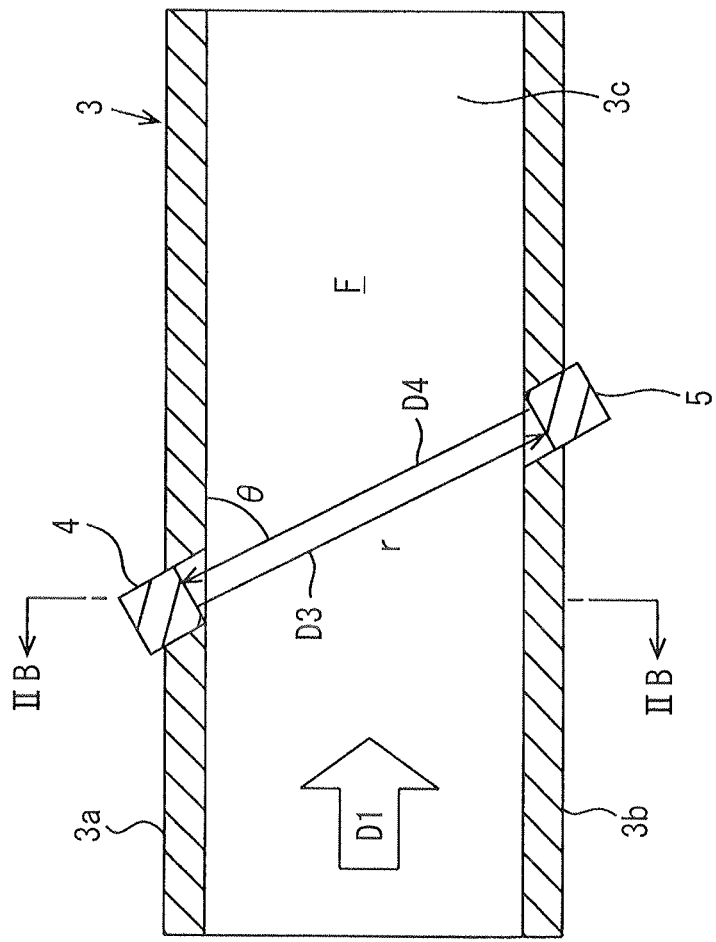
FIG. 2A is a cross-sectional view showing a state where a first ultrasonic sensor and a second ultrasonic sensor in the ultrasonic flow meter are attached to a pipe.
Figure 2B:
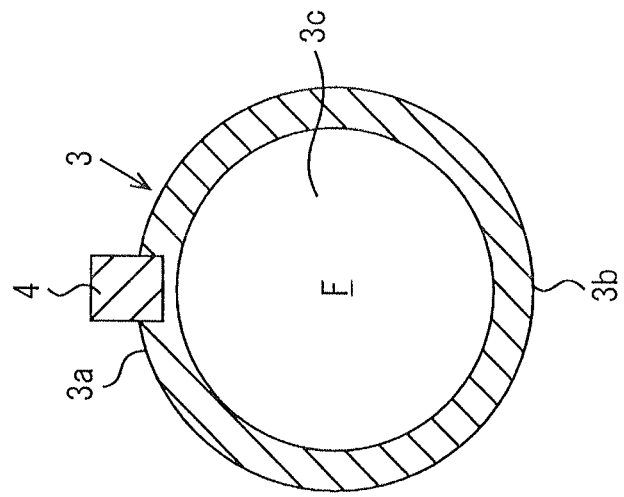
FIG. 2B is a cross-sectional view taken along line IIB-IIB in FIG. 2A.

As shown in FIG. 2A and FIG. 2B, a pipe 3 has an approximately circular cross section. The pipe 3 provides a flow channel 3c in which fluid F flows. The fluid F flows in a flow direction shown by the arrow D1. The fluid F is gas, and a temperature of the gas is changed by a change in humidity. For example, the gas includes air. The pipe 3 has a sidewall 3a located on a side of the flow channel 3c and a sidewall 3b located on the opposite side of the flow channel 3c from the sidewall 3a. The first ultrasonic sensor 4 is disposed on the sidewall 3a, and the second ultrasonic sensor 5 is disposed on the sidewall 3b. The second ultrasonic sensor 5 is disposed downstream of the first ultrasonic sensor 4 in the flow direction D1. The first ultrasonic sensor 4 is located at a distance "r" from the second ultrasonic sensor 5. An angle between the flow direction D1 and radiation axis of the ultrasonic waves is indicated by "θ."

The first ultrasonic sensor 4 transmits the ultrasonic waves from upstream to downstream of the flow channel 3c in a direction shown by the arrow D3. The second ultrasonic sensor 5 transmits the ultrasonic waves from downstream to upstream of the flow channel 3c in the direction shown by the arrow D4. Thus, a propagation time "ta" when the ultrasonic wave is transmitted from the first ultrasonic sensor 4 to the second ultrasonic sensor 5 is shorter than a propagation time "tb" when the ultrasonic wave is transmitted from the second ultrasonic sensor 5 to the first ultrasonic sensor 4. That is, propagation time difference of the ultrasonic wave is generated.

Figure 3A:
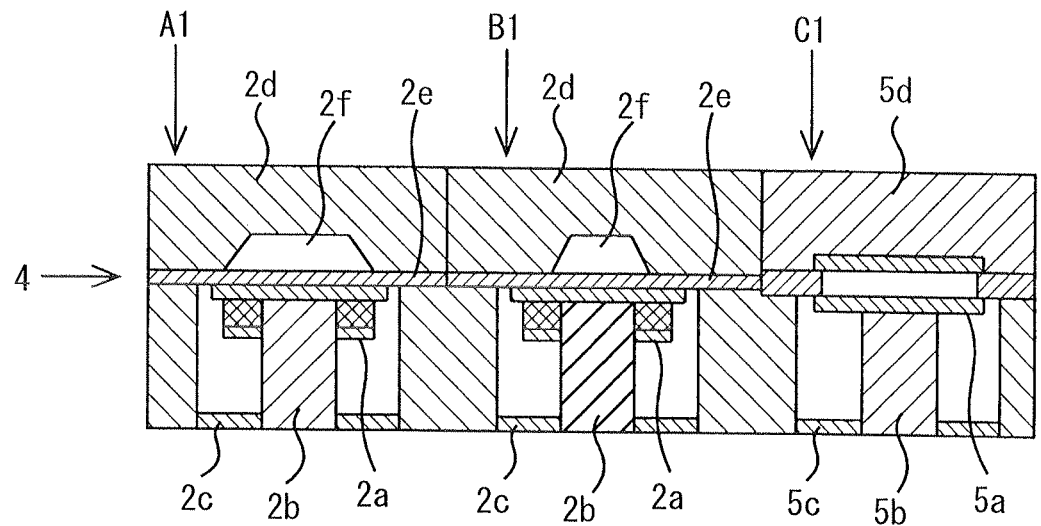
FIG. 3A is a cross-sectional view of the first ultrasonic sensor.
Figure 3B:
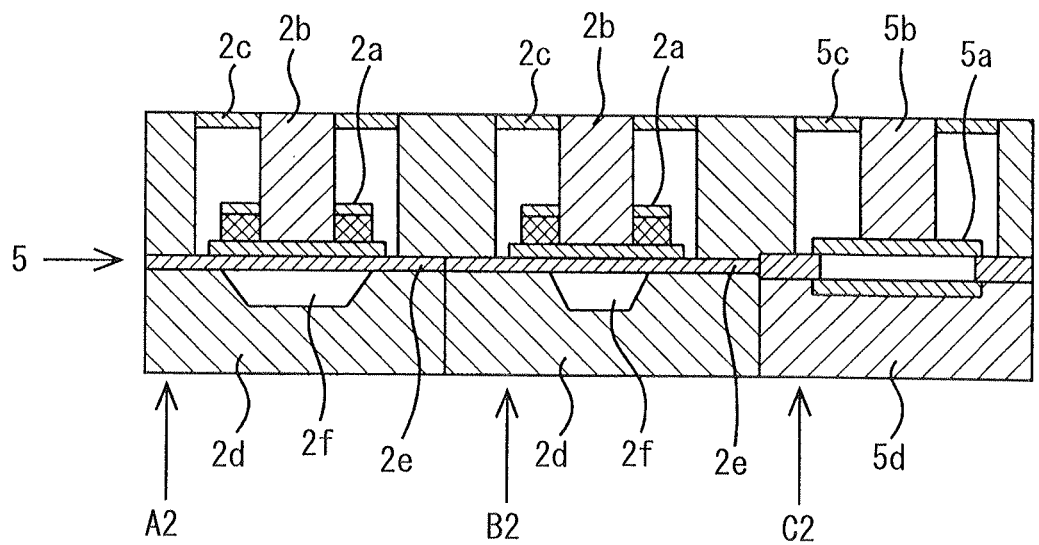
FIG. 3B is a cross-sectional view of the second ultrasonic sensor.
Figure 4A:
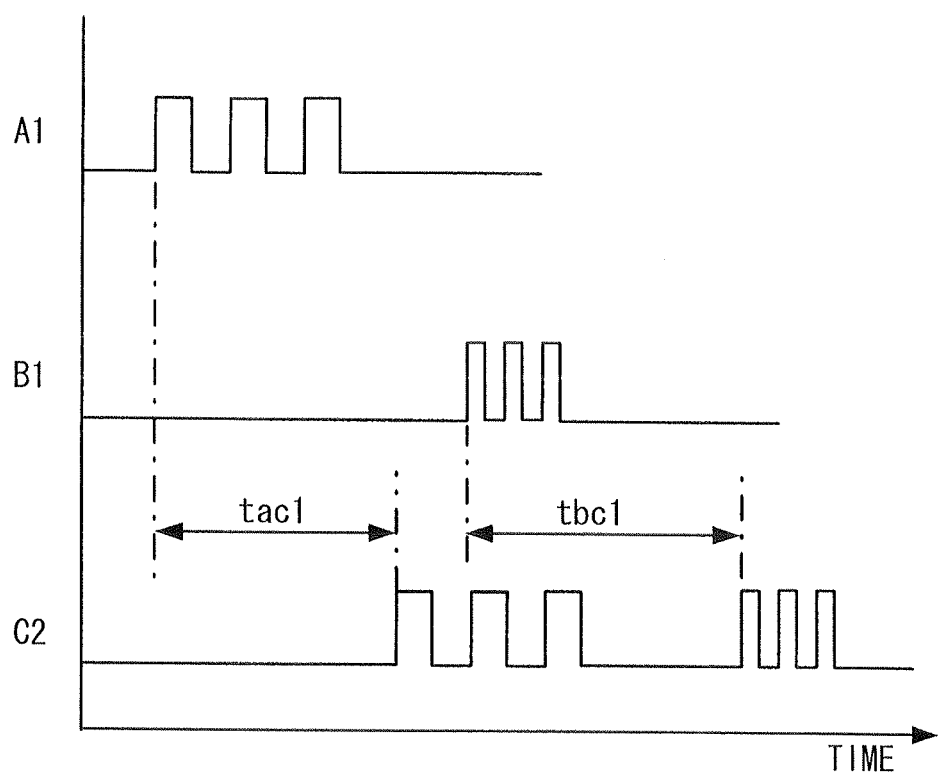
FIG. 4A is a timing diagram showing ultrasonic waves transmitted from the first ultrasonic sensor and ultrasonic waves received by the second ultrasonic sensor.
Figure 4B:
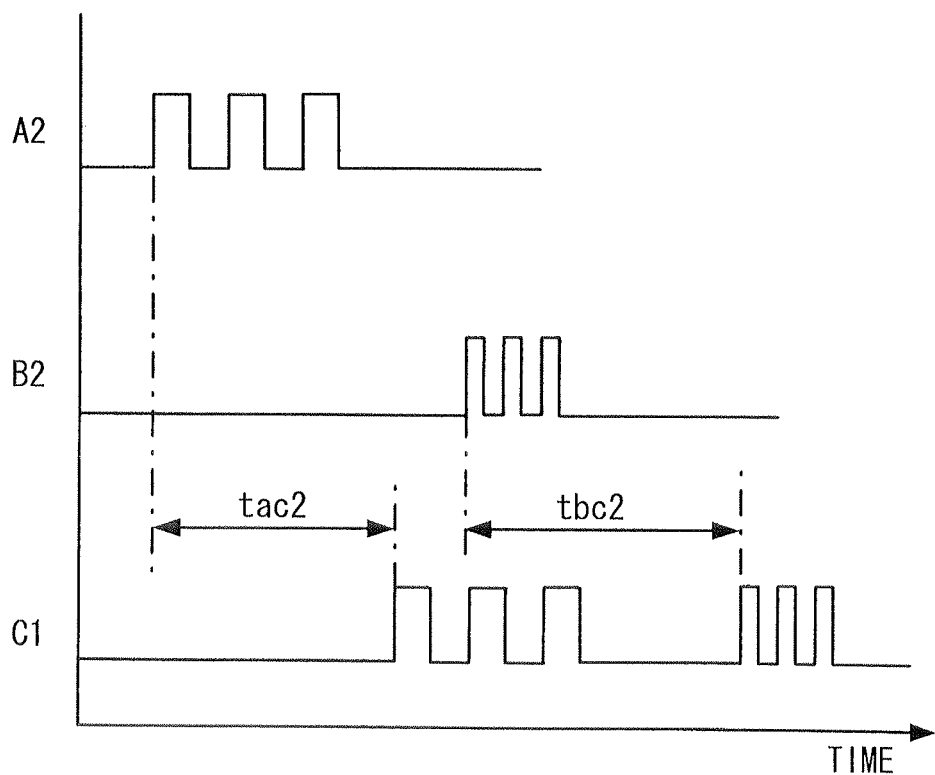
FIG. 4B is a timing diagram showing ultrasonic waves transmitted from the second ultrasonic sensor and ultrasonic waves received by the first ultrasonic sensor.
Figure 5:
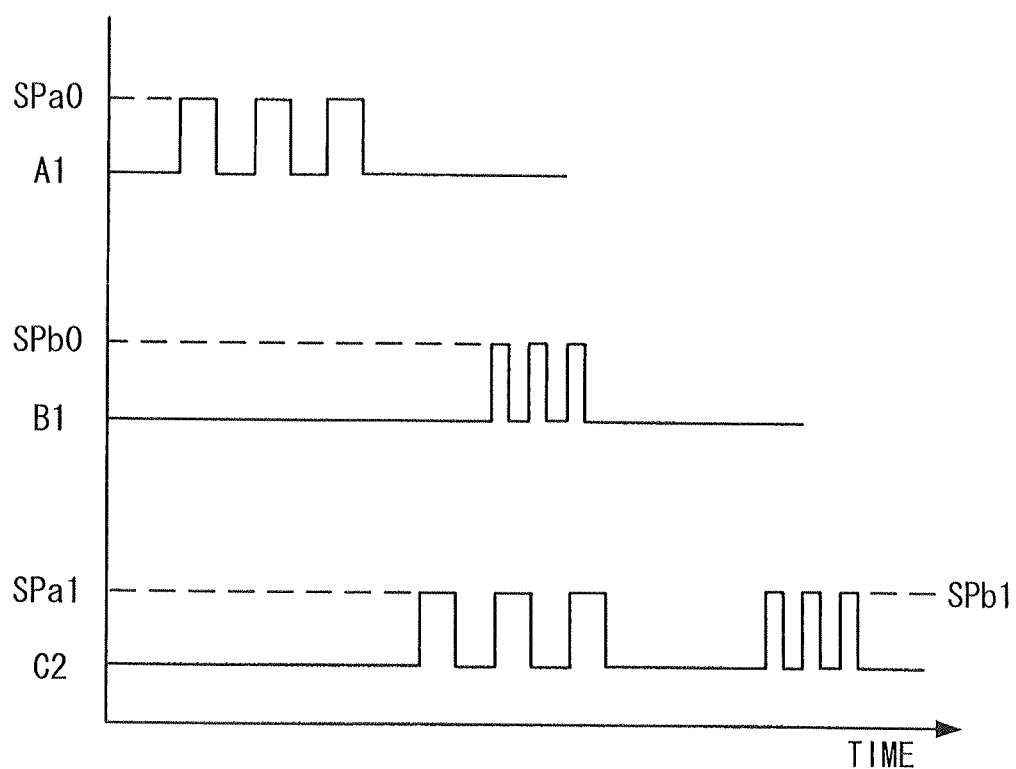
FIG. 5 is a timing diagram showing ultrasonic waves transmitted from the first ultrasonic sensor and ultrasonic waves received by the second ultrasonic sensor.
Figure 6:
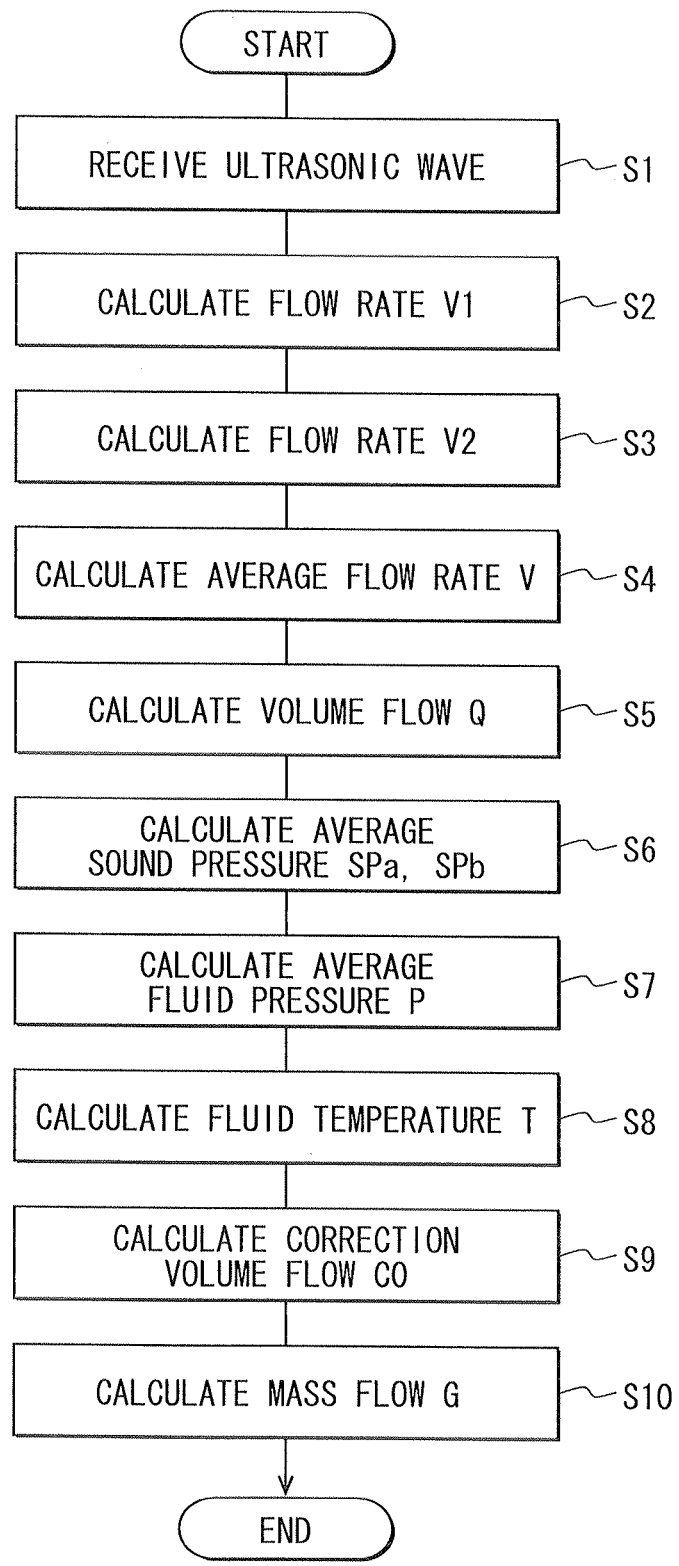
FIG. 6 is a flowchart showing a mass flow operation executed by a CPU.
Figure 7:
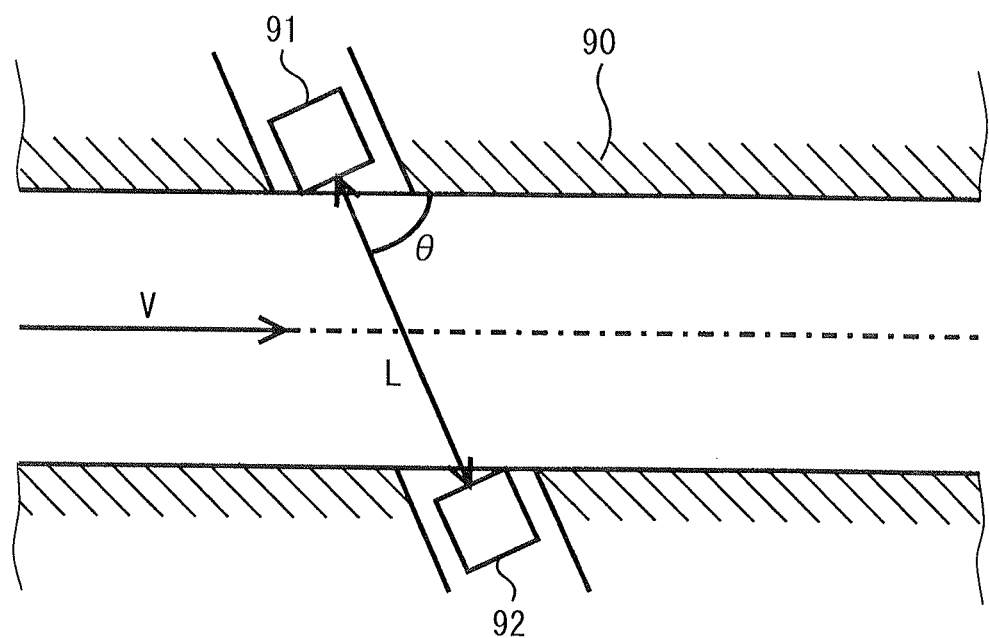
FIG. 7 is a cross-sectional view showing an ultrasonic sonic sensor according to the prior art.

In the present embodiment each of the transmitting elements A1, A2, B1, and B2 is a resonance element, and each of the receiving elements C1 and C2 is a non-resonance element. As shown in FIG. 3A, the transmitting element A1 includes a silicon substrate 2d, a cavity (hollow portion) 2f, a membrane (thin portion) 2e, a piezoelectric element 2a, an acoustic matching layer 2b, and a vibration reducing member 2c. The cavity 2f is provided at a surface portion of the silicon substrate 2d. The membrane 2e covers the silicon substrate 2d. The piezoelectric element 2a is disposed on a surface of the membrane 2e. The acoustic matching layer 2b is inserted into the piezoelectric element 2a. An end of the acoustic matching layer 2b is inserted into the vibration reducing member 2c.

Each piezoelectric element 2a is coupled with a driving circuit (not shown). When a driving signal from the driving circuit is applied to the piezoelectric element 2a, the piezoelectric element 2a causes a piezoelectric effect and vibrates in a vertical direction. The vibration of the piezoelectric element 2a is transmitted to the membrane 2e, and thereby the membrane 2e vibrates. The vibration of the membrane 2e is transmitted to the acoustic matching layer 2b, and thereby the acoustic matching layer 2b vibrates and transmits the ultrasonic wave.

The acoustic matching layer 2b matches an acoustic impedance of the piezoelectric element 2a and an acoustic impedance of the fluid F. The acoustic matching layer 2b also protects the surface of the transmitting element A1. Because the acoustic matching layer 2b is provided with the piezoelectric element 2a, a sound pressure of the ultrasonic wave transmitted from the transmitting element A1 can be increased. The acoustic impedance of the acoustic matching layer 2b is between the acoustic impedance of fluid F and the acoustic impedance of the piezoelectric element 2a. Each of the transmitting elements A2, B1, and B2 has a structure same as the transmitting element A1.

The receiving element C1 includes a silicon substrate 5d, a vibration detecting portion 5a, an acoustic matching layer 5b, and a vibration reducing member 5c. The vibration detecting portion 5a is disposed on a surface of the silicon substrate 5d. The acoustic matching layer 5b is stacked on a surface of the vibration detecting portion 5a. An end of the acoustic matching layer 5b is inserted into the vibration reducing member 5c. The vibration detecting portion 5a is coupled with the detecting circuit (not shown). The vibration detecting portion 5a is a known capacitance element that has a pair of electrodes opposed to each other through a clearance.

When the received wave is transmitted to the acoustic matching layer 5b, the acoustic matching layer 5b vibrates. Due to the vibration of the acoustic matching layer 5b, the electrodes of the vibration detecting portion 5a vibrate, and a capacitance between the electrodes is changed. The detecting circuit detects the received wave based on the capacitance.

The acoustic matching layer 5b matches an acoustic impedance of the vibration detecting portion 5a and the acoustic impedance of the fluid F. Because the acoustic matching layer 5b is provided with the vibration detecting portion 5a, a sound pressure of the ultrasonic wave received by the receiving element C1 can be increased. The acoustic impedance of the acoustic matching layer 5b is between the acoustic impedance of fluid F and the acoustic impedance of the vibration detecting portion 5a. The receiving element C2 has a structure same as the receiving element C1. Each of the transmitting elements and the receiving elements can be formed by a technique of MEMS (Micro Electro Mechanical Systems) or a technique other than MEMS. A configuration without an acoustic matching layer may also be used.

Next, an electrical configuration of the ultrasonic flow meter 1 will be described with reference to FIG. 1.

As shown in FIG. 1, the ultrasonic flow meter 1 includes an operation section (OPE) 20, a transmission control section (TRANS) 30, and a reception control section (REC) 40. The transmission control section 30 is coupled with the transmitting elements A1 B1, A2, and B2 and controls the driving circuit coupled with each transmitting element. The transmission control section 30 orders that the transmitting elements A1 and A2 transmit the ultrasonic waves of the frequency "fa" and the transmitting elements B1 and B2 transmit the ultrasonic waves of the frequency "fb."

The reception control section 40 is coupled with the receiving elements C1 and C2 and controls the detecting circuit coupled with each receiving element. The reception control section 40 orders that the receiving elements C1 and C2 receive the ultrasonic waves of the frequencies "fa" and "fb." The reception control section 40 receives a detection signal corresponding to the received wave detected by the detection circuit coupled with each receiving element, amplifies the detection signal, and output the amplified detection signal to the operation section 20.

The operation section 20 includes a CPU 21, a ROM 22, and a RAM 23. The CPU 21 performs a designation of the transmitting element to transmit the ultrasonic wave and an order of the transmission to the transmission control section 30. The CPU 21 calculates a mass flow "G" of the fluid F based on the detection signal from the reception control section 40. The ROM 22 stores a computer program required for the CPU 21 to operate the mass flow "G." The RAM 23 temporarily stores the computer program read from the ROM 22 and an operation result of the CPU 21.

Next, a mass flow operation performed by the CPU 21 in the operation section 20 will be described with reference to FIG. 4A to FIG. 6.

At S1, the CPU 21 outputs a transmission order for transmitting the ultrasonic waves to the transmission control section 30 and outputs a reception order for receiving the ultrasonic wave to the reception control section 40. Accordingly, the first ultrasonic sensor 4 and the second ultrasonic sensor 5 alternately transmit and receive the ultrasonic waves of the frequencies "fa" and "fb." The first ultrasonic sensor 4 transmits the ultrasonic wave of the frequency "fa" from the transmitting element A1 to the second ultrasonic sensor 5. Then, the first ultrasonic sensor 4 transmits the ultrasonic wave of the frequency "fb" from the transmitting element B1 to the second ultrasonic sensor 5. The receiving element C2 of the second ultrasonic sensor 5 receives the ultrasonic wave of the frequency "fa" transmitted from the transmitting element A1. Then, the receiving element C2 receives the ultrasonic wave of the frequency "fb" transmitted from the transmitting element B1.

A time from when the transmitting element A1 transmits the ultrasonic wave of the frequency "fa" to when the receiving element C2 receives the ultrasonic wave, that is, a propagation time of the ultrasonic wave of the frequency "fa" from the first ultrasonic sensor 4 to the second ultrasonic sensor 5 is indicated by "tac1." A time from when the transmitting element B1 transmits the ultrasonic wave of the frequency "fb" to when the receiving element C2 receives the ultrasonic wave, that is, a propagation time of the ultrasonic wave of the frequency "fb" from the first ultrasonic sensor 4 to the second ultrasonic sensor 5 is indicated by "tbc1."

Next, the second ultrasonic sensor 5 outputs the ultrasonic wave of the frequency "fa" from the transmitting element A2 to the first ultrasonic sensor 4. Then, the second ultrasonic sensor 5 transmits the ultrasonic wave of the frequency "fb" from the transmitting element B2 to the first ultrasonic sensor 4. The receiving element C1 of the first ultrasonic sensor 4 receives the ultrasonic wave of the frequency "fa" transmitted from the transmitting element A2. Then, the receiving element C1 receives the ultrasonic wave of the frequency "fb" transmitted from the transmitting element B2.

A time from when the transmitting element A2 transmits the ultrasonic wave of the frequency "fa" to when the receiving element C1 receives the ultrasonic wave, that is, a propagation time of the ultrasonic wave of the frequency "fa" from the second ultrasonic sensor 5 to the first ultrasonic sensor 4 is indicated by "tac2." A time from when the transmitting element B2 transmits the ultrasonic wave of the frequency "fb" to when the receiving element C1 receives the ultrasonic wave, that is, a propagation time of the ultrasonic wave of the frequency "fb" from the second ultrasonic sensor 5 to the first ultrasonic sensor 4 is indicated by "tbc2."

At S2, the CPU 21 calculates a flow rate "V1" at a time when the ultrasonic wave of the frequency "fa" is used from following equation (5). In equation (5), "r" is a distance between the first ultrasonic sensor 4 and the second ultrasonic sensor 5, and "θ" is an angle between the flow direction D1 of the fluid F and the radiation axis of the ultrasonic wave.

$$V1 = r((1/tac1) - (1/tac2))/2 \cos \theta \tag{5}$$

At S3, the CPU 21 calculates a flow rate "V2" at a time when the ultrasonic wave of the frequency "fb" is used from following equation (6).

$$V2 = r((1/tbc1) - (1/tbc2))/2 \cos \theta \tag{6}$$

At S4, the CPU 21 calculates an average flow rate "V" based on the flow rate "V1" and the flow rate "V2." At S5, the CPU 21 calculates a volume flow "Q" of the fluid F at the flow rate "V" from following equation (7). In equation (7), "S" is a cross-sectional area of the flow channel 3c.

$$Q1 = S \times V \tag{7}$$

At S6, the CPU 21 calculates an average sound pressure "SPa" of the ultrasonic wave of the frequency "fa" and an average sound pressure "SPb" of the ultrasonic wave of the frequency "fb." At S7, the CPU 21 calculates an average fluid pressure "P". The CPU 21 calculates the average sound pressures SPa, SPb and the average fluid pressure "P" by analyzing the detection signals input to the reception control section 40 from the detection circuit of the receiving element C1. For example, the CPU 21 performs a fast Fourier transform (FFT) of the detection signals for calculating the sound pressure and the pressure.

In other words, the CPU 21 calculates a sound wave component (a component of the frequency) and a static pressure component (a part other than the frequency) by performing the fast Fourier transform of the detection signals, calculates the sound pressure based on the sound wave component, and calculates the fluid pressure based on the pressure component. In addition, the CPU 21 calculates the sound pressure and the fluid pressure for each of the ultrasonic waves of the frequencies "fa" and "fb" using the detection signals from the receiving element C1 and calculates the average sound pressure and the average fluid pressure from the calculation result.

At S8, the CPU 21 calculates the fluid temperature "T". Following equations (1)-(3) are disclosed by E. J. Evans and E. N. Bazley in Acustica 6 238-244 (1956), and are equations for calculating a sound pressure. In equation (1), "P" is the sound pressure, "P0" is an initial value of the sound pressure, "r" is a distance between the first ultrasonic sensor 4 and the second ultrasonic sensor 5, "m" is an absorption coefficient, "A" is a coefficient calculated from an experimental value, and "e" is exponential.

$$SP = SP0 \frac{A \times e^{-mr}}{r} \quad (1)$$

The absorption coefficient "m" can be calculated from following equation (2). In equation (2), "T" is the fluid temperature, "f" is the frequency of the ultrasonic wave, and "M" is a coefficient (literature value).

$$m = (33 + 0.2T)f^2 \times 10^{-12} + \frac{M \times f}{\frac{k}{2\pi f} + \frac{2\pi f}{k}} \quad (2)$$

The factor "k" in equation (2) can be calculated from following equation (3). In equation (3), "G0" is a saturated vapor pressure, "G" is an atmospheric pressure, and "h" is a humidity.

$$k = 1.92 \times \left(\frac{G0}{G} \times h\right)^{1.3} \times 10^5 \quad (3)$$

The saturated vapor pressure in equation (3) can be calculated from the known Tetens formula shown by equation (4). In equation (4), "T" is a temperature.

$$G0 = 6.11 \times 10^{\wedge} 7.5T/(T+237.3) \quad (4)$$

The average sound pressure of the ultrasonic wave of the frequency "fa" is indicated by "SPa," an initial value of the sound pressure is indicated by "SPa0," and the absorption coefficient is indicated by "ma." The initial value "SPa0" of the sound pressure is preliminarily measured. By substituting the average sound pressure "SPa" calculated from equation (7) and the initial value "SPa" of the sound pressure, which is preliminarily, found, into equation (1), following equation (8) is obtained.

$$SPa = SPa0 \frac{A \times e^{-mar}}{r} \quad (8)$$

Next, the average sound pressure of the ultrasonic wave of the frequency "fb" is indicated by "SPb," an initial value of the sound pressure is indicated by "SPb0," the absorption coefficient is indicated by "mb." The initial value "SPb0" of the sound pressure is preliminarily measured. By substituting the average sound pressure "SPb" calculated from equation (7) and the initial value "SPb" of the sound pressure, which is preliminarily found, into equation (1), following equation (9) is obtained.

$$SPb = SPb0 \frac{A \times e^{-mbr}}{r} \quad (9)$$

In above-described equations (8) and (9), only the humidity "h" and the temperature "T" included in the factors "ma" and "mb" are unknown, and the humidity "h" and the temperature "T" are variable. In other words, equations (8) and (9) are equations indicating an interrelation of the humidity "h" and the temperature "T." Thus, by solving simultaneously equations (8) and (9) in which the humidity "h" and the temperature "T" are unknown, the temperature "T" can be calculated. The calculated temperature "T" reflects the humidity "h," and the temperature "T" changed by the humidity "h" can be calculated.

At S9, the CPU 21 calculates the correction volume flow "Q0." The correction volume flow "Q0" can be calculated using the Boyle-Charle's law. The standard temperature (273.15K) is indicated by "T0," the standard pressure (1.0332 kg/cm$^3$) is indicated by "P0," and the average volume flow calculated at S5, that is, the average volume flow to be corrected is indicated by "Q." Following equations (10) and (11) are obtained from the Boyle-Charle's law. The factor "k1" is a constant.

$$Q0 = (T0/P0) \cdot k1 \quad (10)$$

$$Q = (T/P) \cdot K1 \quad (11)$$

Following equation (12) is obtained from above-described equations (10) and (11).

$$Q0 = (T0 \cdot P/T \cdot P0) \times Q \quad (12)$$

The correction volume flow "Q0" is calculated by substituting the volume flow "Q" calculated at S5, the average fluid pressure "P" calculated at S6, and the fluid temperature T calculated at S7, the standard temperature T0, and the standard pressure P0 into equation (12).

At S10, the CPU 21 calculates the mass flow "G" from following equation (13). In equation (13), "ρ" is a density of the fluid F.

$$G = \rho \cdot Q0 \quad (13)$$

The density "ρ" of the fluid F can be calculated by a known method. For example when the acoustic impedance of fluid is "Z," and a sound speed in the fluid F is "C," following equation (14) is obtained.

$$Z = \rho \cdot C \quad (14)$$

From equation (14), following equation (15) for calculating the density "ρ" can be obtained.

$$\rho = Z/C \quad (15)$$

The acoustic impedance can be calculated from the intensity of the received wave. For example, the acoustic impedance can be calculated from a peak value of the received wave. In a case where the fluid F is air, and the density of the fluid F can be handled as a constant value, a density of vapor can be used as the density "ρ." If it is not required to calculate the mass flow "G," the measurement process can be finished at a time when the correction volume flow "Q0" is calculated.

The CPU 21 in the operation section 20 may include a volume-flow operation portion, a temperature operation portion, a pressure operation portion, a correction operation portion, and a mass-flow operation portion. The volume-flow operation portion performs the process at S1-S5, the temperature operation portion performs the process at S8, the pressure operation portion performs the process at S7, the correction operation portion performs the process at S9, and the mass-flow operation portion performs the process at S10.

In other words, the volume-flow operation portion orders the first ultrasonic sensor 4 and the second ultrasonic sensor 5 to transmit and receive the ultrasonic waves alternately. The volume-flow operation portion calculates a propagation time difference of the ultrasonic waves between the first ultrasonic sensor 4 and the second ultrasonic sensor 5 and calculates the volume flow of the fluid based on the propagation time difference. The temperature operation portion analyzes the signals output from the first ultrasonic sensor 4 or the second ultrasonic sensor 5 that receives the ultrasonic waves and calculates the temperature of the fluid corresponding to the humidity of the fluid based on an analyzing result. The pressure operation portion analyzes the signals output from the first ultrasonic sensor 4 or the second ultrasonic sensor 5 that receives the ultrasonic waves and calculates the pressure of the fluid based on an analyzing result. The correction operation portion corrects the volume flow calculated by the volume-flow operation portion with the temperature calculated by the temperature operation portion and the pressure calculated by the pressure operation portion. The mass-flow operation portion calculates the mass flow of the fluid based on the volume flow corrected by the correction operation portion and the density of the fluid.

The ultrasonic flow meter 1 according to the present embodiment calculates the volume flow "Q," the fluid pressure "P," and the temperature "T" that reflects the humidity using the ultrasonic waves of different frequencies, and corrects the volume flow "Q" with the fluid pressure "P" and the temperature "T."

Thus, the ultrasonic flow meter 1 can correct the volume flow "Q" based on the fluid pressure "P" and the humidity "h" without a pressure sensor and a temperature sensor. Because an installing space for a pressure sensor and a temperature sensor are not required, the dimension of the ultrasonic flow meter 1 can be reduced. Furthermore, because a pressure sensor and a temperature sensor are not provided, a power consumption of the ultrasonic flow meter 1 can be reduced.

The ultrasonic flow meter 1 can calculate the mass flow "G" by calculating the product of the correction volume flow "Q0" and the density "ρ." Furthermore, the ultrasonic flow meter 1 can calculate the volume flow or the mass flow only by operation without using a table or a map, and the fluid pressure and the temperature are reflected in measuring results in real time. Thus, the measuring accuracy can be improved.

The ultrasonic flow meter 1 calculates the average of the propagation time differences of respective ones of the ultrasonic waves transmitted and received by the ultrasonic sensors 4 and 5 and calculates the volume flow based on the average. Thus, the measuring accuracy is further improved. When the ultrasonic flow meter 1 calculates the fluid temperature, the ultrasonic flow meter 1 calculates the sound pressures of respective ones of the ultrasonic waves of difference frequencies and uses the average of the sound pressures. Thus, the measuring accuracy is further improved.

Because each of the transmitting elements is a resonance element, the sound pressure of the ultrasonic wave can be improved, and the measuring accuracy can be improved. In addition, because each of the receiving elements is a non-resonance element, each of the receiving elements can receive the ultrasonic waves of different frequencies. Furthermore, because the number of receiving elements can be reduced, the dimension of the ultrasonic flow meter 1 can be reduced.

Each of the receiving elements is a capacitance element and a resonance frequency is broad. Thus, a high dimension accuracy is not required for a vibration portion, and the ultrasonic flow meter 1 can be easily manufactured.

Other Embodiments

Although the present invention has been fully described in connection with the preferred embodiments thereof with reference to the accompanying drawings, it is to be noted that various changes and modifications will become apparent to those skilled in the art.

The humidity of the fluid can also be detected based on a phase difference of ultrasonic waves received by a plurality of receiving elements as disclosed, for example, in JP-A-6-258298.

As a transmitting element, a thermally induced sound source that generates an ultrasonic wave by expanding and contracting medium due to generation of heat by a heating body can also be used as disclosed, for example, in JP-A-2004-153797.

As a receiving element, a capacitance element that is formed by processing a silicon semiconductor substrate with a silicon micro machining technique can also be used. When the capacitance receiving element is used, matching of the acoustic impedance with the fluid becomes easy.

What is claimed is:

1. An ultrasonic flow meter comprising:

a first ultrasonic sensor and a second ultrasonic sensor, each of the first ultrasonic sensor and the second ultrasonic sensor transmitting and receiving a plurality of ultrasonic waves of different frequencies, the first ultrasonic sensor disposed on a side of a flow channel in which fluid flows in a flow direction, the second ultrasonic sensor disposed on an opposite side of the flow channel from the first ultrasonic sensor, the second ultrasonic sensor disposed downstream of the first ultrasonic sensor in the flow direction;

a volume-flow operation portion ordering the first ultrasonic sensor and the second ultrasonic sensor to transmit and receive one of the plurality of ultrasonic waves alternately, the volume-flow operation portion calculating a propagation time difference of the one of the plurality of ultrasonic waves between the first ultrasonic sensor and the second ultrasonic sensor and calculating a volume flow of the fluid based on the propagation time difference;

a temperature operation portion analyzing signals output from the first ultrasonic sensor or the second ultrasonic sensor that receives the plurality of ultrasonic waves and calculating a temperature of the fluid corresponding to a humidity of the fluid based on an analyzing result;

a pressure operation portion analyzing signals output from the first ultrasonic sensor or the second ultrasonic sensor that receives the plurality of ultrasonic waves and calculating a pressure of the fluid based on an analyzing result; and a correction operation portion correcting the volume flow calculated by the volume-flow operation portion with the temperature calculated by the temperature operation portion and the pressure calculated by the pressure operation portion, wherein each of the first ultrasonic sensor and the second ultrasonic sensor includes a plurality of transmitting elements, and each of the plurality of transmitting elements transmits an ultrasonic wave of a different frequency.

2. The ultrasonic flow meter according to claim 1, wherein the temperature operation portion analyzes the signals output from the first ultrasonic sensor or the second ultrasonic sensor that receives the plurality of ultrasonic waves, the temperature operation portion calculates sound pressures of respective ones of the plurality of ultrasonic waves based on the analyzing result, and the temperature operation portion calculates the temperature of the fluid corresponding to the humidity of the fluid based on the sound pressures.

3. The ultrasonic flow meter according to claim 2, wherein the temperature operation portion calculates the temperature "T" of the fluid from equations (1)-(4):

$$SP = SP0 \frac{A \times e^{-mr}}{r} \quad (1)$$

$$m = (33 + 0.2T)f^2 \times 10^{-12} + \frac{M \times f}{\frac{k}{2\pi f} + \frac{2\pi f}{k}} \quad (2)$$

$$k = 1.92 \times \left(\frac{G0}{G} \times h\right)^{1.3} \times 10^5 \quad (3)$$

$$G0 = 6.11 \times 10^{\wedge} 7.5T/(T + 237.3) \quad (4)$$

wherein "SP" is the sound pressure, "SP0" is an initial value of the sound pressure, "r" is a propagation distance of the plurality of ultrasonic waves, "m" is an absorption coefficient, "T" is the temperature of the fluid, "f" is a frequency of each of the plurality of ultrasonic waves, "G" is an atmospheric pressure, "G0" is a saturated vapor pressure, "h" is a humidity of the fluid, and "M" and "A" are coefficients.

4. The ultrasonic flow meter according to claim 2, wherein when the temperature operation portion calculates the sound pressures, the temperature operation portion analyzes the signals output from the first ultrasonic sensor or the second ultrasonic sensor that receives the plurality of ultrasonic waves, and the temperature operation portion calculates an average of the sound pressures of respective ones of the plurality of the ultrasonic waves.

5. The ultrasonic flow meter according to claim 1, wherein
the volume-flow operation portion orders the first ultrasonic sensor and the second ultrasonic sensor to transmit and receive the plurality of ultrasonic waves of different frequencies alternately,
the volume-flow operation portion calculates an average of propagation time differences of respective ones of the plurality of ultrasonic waves, and
the volume-flow operation portion calculates the volume flow based on the average of the propagation time differences.

6. The ultrasonic flow meter according to claim 1, further comprising
a mass flow operation portion calculating a mass flow of the fluid based on the volume flow corrected by the correction operation portion and a density of the fluid.

7. The ultrasonic flow meter according to claim 1, wherein
each of the plurality of transmitting elements is a resonance element.

8. The ultrasonic flow meter according to claim 7, wherein
each of the plurality of transmitting elements includes a piezoelectric element and an acoustic matching layer.

9. The ultrasonic flow meter according to claim 1, wherein
each of the first ultrasonic sensor and the second ultrasonic sensor includes a receiving element that receives the plurality of ultrasonic waves of different frequencies.

10. The ultrasonic flow meter according to claim 9, wherein
each of the receiving elements is a non-resonance element.

11. The ultrasonic flow meter according to claim 10, wherein
each of the receiving elements is a capacitance element.

* * * * *